United States Patent [19]

Peters

[11] Patent Number: 4,788,939

[45] Date of Patent: Dec. 6, 1988

[54] CLEAN WORK AREA

[75] Inventor: Max D. Peters, Plymouth, Minn.

[73] Assignee: Nu Aire, Inc., Plymouth, Minn.

[21] Appl. No.: 71,514

[22] Filed: Jul. 9, 1987

[51] Int. Cl.[4] ............................................. A01K 1/02
[52] U.S. Cl. ..................................................... 119/17
[58] Field of Search ............................. 119/17, 21, 15

[56] References Cited

U.S. PATENT DOCUMENTS

| | | |
|---|---|---|
| 3,301,167 | 1/1967 | Howard et al. |
| 3,557,756 | 1/1971 | Ramsey |
| 3,630,174 | 12/1971 | Runkle et al. |
| 3,828,530 | 8/1974 | Peters |
| 3,870,490 | 3/1975 | Landy |
| 3,926,597 | 12/1975 | Landy |
| 4,023,529 | 5/1977 | Landy |
| 4,060,025 | 11/1977 | Pelosi, Jr. |
| 4,098,174 | 7/1978 | Landy |
| 4,202,676 | 5/1980 | Pelosi, Jr. et al. |

OTHER PUBLICATIONS

Brochure of Germfree Laboratories, Inc. entitled "Laminar Air for Animal Care".
Brochure of NuAire, Inc. entitled "HEPEX Absolute Filter System".
Brochure of BioClean (a division of Hazleton Systems Incorporated) describing features and specifications of the Duo-Flow portable cleanroom.
Brochure of Lab Products, Inc. (a BioMedic Company) describing its See-Through Suspended Cage System.
Brochure from NuAire "Animal Isolator", product designation number NU-124.
Brochure of Airo Clean Engineering Inc. pertaining to the Airo/Neg-Clean Porch Microb-Clean System.
Drawing labeled SK-00528 illustrating a porch enclosure which was sold about 1972.

Primary Examiner—Robert Peshock
Attorney, Agent, or Firm—Merchant, Gould, Smith, Edell, Welter & Schdmit

[57] ABSTRACT

A work station is enclosed comprising a housing having first and second openings with first and second filter mediums disposed covering each of the first and second openings, respectively. The second filter medium is selected to filter particulate matter finer than that filtered by the first filter medium. A blower is provided with duct work for guiding air from the first filter media to the blower inlet and from the blower inlet to the second filter medium. A plurality of animal cages are positioned adjacent the first opening exterior of the housing. A curtain encloses a work area on a side of the housing in air flow communication with the first opening and air is directed from the second opening into the work area.

13 Claims, 1 Drawing Sheet

CLEAN WORK AREA

BACKGROUND OF THE INVENTION

I. Field of the Invention

This invention pertains to apparatus for use in working with laboratory animals such as rats, rabbits and the like. More specifically, this invention is directed to such an apparatus which provides a work area for a lab technician or other lab workers which is free of potentially harmful microorganisms from the animals.

II. Description of the Prior Art

Apparatus for use with laboratory animals is known. One such apparatus is shown in U.S. Pat. No. 4,023,529 to Landy dated May 17, 1977. A similar apparatus is shown in the brochure of the Germ-Free Laboratories, Inc. entitled "LAMINER AIR FOR ANIMAL CARE" which describes products named Single-Flow Animal Station and a Double-Flow Animal Station. An example of an apparatus for providing a self-contained clean space is shown in U.S. Pat. No. 4,202,676 to Pelosi, Jr. et al. dated May 13, 1980.

SUMMARY OF THE INVENTION

According to a preferred embodiment of the present invention, an animal station is provided having a housing defining an interior with a first filter medium (a prefilter) disposed to filter particulate matter from air flowing through a first opening and a second filter medium (a high energy particulate air on HEPA filter) disposed to filter particulate matter from air flowing through a second opening. The second filter media is selected to filter a particulate matter finer than that filtered by the first filter medium. A blower draws air from the first filter media and forces the air through the second filter media. Air from the second filter media is blown into an enclosed work area. Air within the enclosed work area is passed through animal cages and admitted to the first particulate filter.

DESCRIPTION OF THE PREFERRED EMBODIMENT

Figure 1:
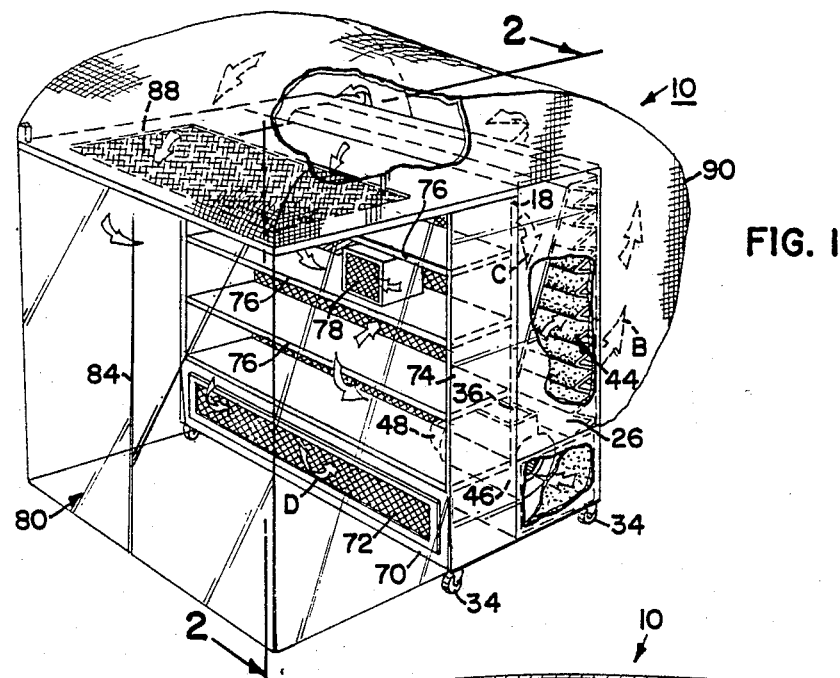
FIG. 1 is a perspective view of an apparatus according to the present invention.
Figure 2:
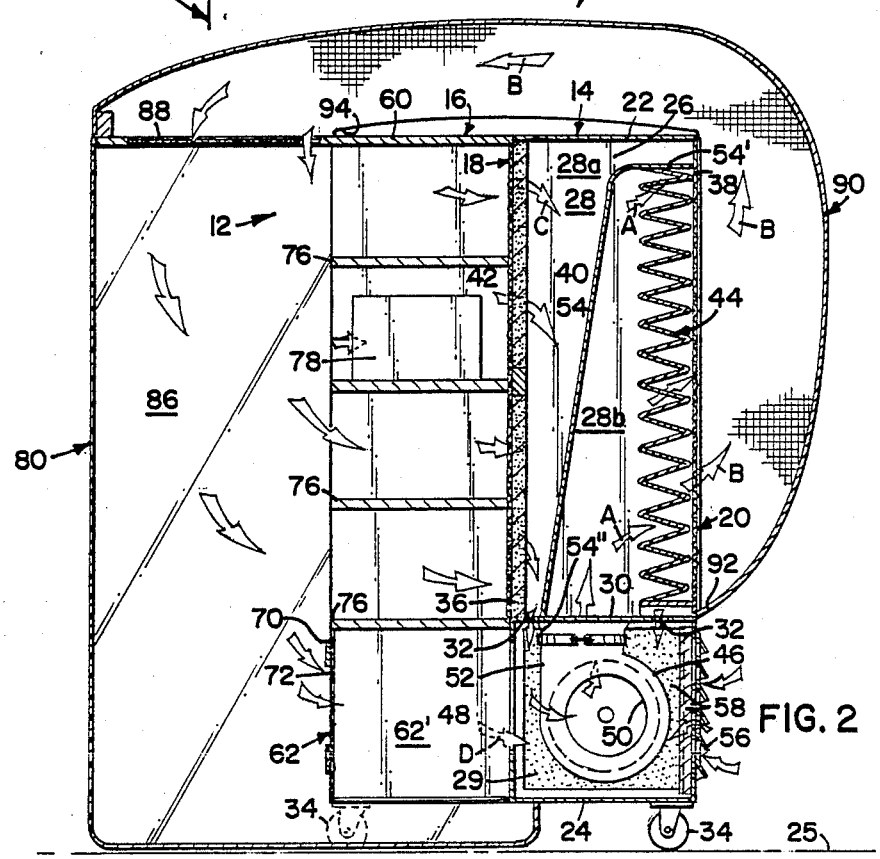
FIG. 2 is a cross-sectional view of the apparatus taken along line 2—2.

The animal station of the present invention is shown generally at 10. The station includes a cabinet 12 having a filtering housing portion 14 and a rack portion 16. Housing portion 14 includes vertical front wall 18 and parallel spaced apart rear wall 20. Walls 18 and 20 are connected by top and bottom walls 22, 24 and side walls such as side wall 26 to define an enclosed housing interior. An intermediate dividing wall 30 divides the interior into an upper chamber 28 and a lower chamber 29. A plurality of openings 32 formed through intermediate dividing wall 30 connect upper chamber 28 in air flow communication with lower chamber 29. Casters 34 connected to bottom wall 24 support cabinet 12 to roll on a support surface 25.

A first opening 36 is formed in front wall 18 and a second opening 38 is formed in rear wall 20. Each of openings 36 and 38 are sized to extend generally the entire distance between opposing side walls 26 and the distance between top wall 14 and intermediate wall 30.

A first filter 40 is disposed covering first opening 36. First filter 40 is any conventional prefilter and preferably comes in the form of a plurality of filtering panels which are connected to housing portion 14 through any suitable means not shown. First filter 40 may be such filters as are commonly found in residential furnace filtering applications. Filter 40 is selected to filter fur and dander from air flowing through filter 40. A protective screen 42 covers the exterior of first filter 40.

A second filter medium 44 covers second opening 38. Filter 44 is preferably a high efficiency particulate air filter (commonly known in the art as a HEPA filter) selected to separate microorganisms from air flow through the filter.

Disposed within lower chamber 29 is a blower 46 and motor 48 supported within chamber 29 in any suitable means not shown. The blower 46 has an inlet 50 and an outlet 52.

A duct 54 connects the outlet 52 of blower 46 with the HEPA filter 44. Preferably the duct 54 is a flexible plenum having a first end 54' which surrounds the HEPA filter 44 and a second end 54" which surrounds blower outlet 52. Accordingly, the duct 54 separates chamber 28 into a first sub-chamber 28a and a second sub-chamber 28b.

With blower 46 operating, suction on blower inlet 50 creates a negative pressure within sub-chamber (that is a pressure less than ambient air pressure). The air blown from blower 46 creates a positive pressure within sub-chamber 28b (i.e. a pressure greater than ambient air pressure).

It will be appreciated that a HEPA filter having a flexible plenum with a first end surrounding a HEPA filter and a second end surrounding a blower outlet forms no part of this invention per se and may be such as that manufactured and sold uner the trademark HEPEX by Nu Aire, Inc. of Plymouth, Minn. and as described in U.S. Pat. No. 3,828,530.

Rear wall 20 includes an air grid 56 formed within the rear wall beneath intermediate dividing wall 30. Grid 56 permits air flow from ambient air into lower chamber 29. Panels 58 of activated charcoal are provided surrounding the inlet 50 to blower 46 such that air admitted into blower 46 first passes through charcoal panels 58 for odor control.

The rack portion 16 includes a cantilevered top wall 60 and a lower cabinet portion 62. Lower cabinet portion 62 is a box having a top wall, bottom wall and side walls defining a reservoir chamber 62' with a front wall 70 having a grid 72 for admitting air through the grid 72 into chamber 62'. Air from chamber 62' flows into chamber 29 and into blower inlet 50.

The rack portion 14 also includes side walls 74 and a plurality of shelves 76 extending between side walls 74. The spacing of the shelves 76 is selected so that any conventional animal cage 78 may be disposed on a shelf 76.

A transparent flexible plastic curtain 80 is provided suspended from top wall 60. Curtain 80 is sized to extend completely from top wall 60 to a floor 25. Curtain 80 defines an enclosed work area 86 exposed to the shelving 76 and animal cages 78. The work area 86 is sized for an operator to work comfortably while tending to animals with the cages 78 in shelves 76. The curtain 80 has a slit 84 for permitting an operator to open the curtain and enter and exit work area 86 but leaving work area 86 enclosed and sealed after the workers has completed its entry or exit of the area 86.

Slit 84 may be sealed through any suitable means such as a Velcro seal or a zipper seal.

Cantilevered top wall 60 has a screened portion 88 above work area 86 which permits air flow through top wall 60. A flexible pressure plenum 90 of suitable plastic material is provided having a first end 92 surrounding opening 38 on an exterior side of the housing 14. Plenum 90 has a second end 94 surrounding screen portion 88 on top of wall 60. Plenum 90 defines a duct way 96 connecting HEPA filter 44 and screen portion 88 in confined air flow communication.

In operation of the apparatus, motor 48 drives blower 46 for air to be admitted into inlet 50. Air (arrow A) from inlet 50 is forced into pressure chamber 28b and forced through HEPA filter 44. HEPA filter 44 cleanses the air of ultra fine particulate matter such as microorganisms. Purified air (arrow B) from HEPA filter 44 passes into pressure plenum 90 and is directed to screen 88. The air passes through the screen 88 into work area 86.

The negative pressure caused by the suction of blower 46 causes air from work area 86 to be drawn both through prefilter 40 and grid 72. Air from work area 86 drawn through grid 40 passes through the rack portion 14 and through animal cages 78 disposed on rack shelf 76. As the air passes the animal cages, it collects fur, dander and microorganisms. The fur and dander are separated from the air flow by the prefilter 40 with the air (arrow C) containing the microorganism being admitted into sub-chamber 28a. Since sub-chamber 28a is at an air pressure less than ambient air pressure, any leakage within the cabinet will result in air flow from atmosphere into chamber 28a without contamination of exterior air.

Air from chamber 28a is drawn through openings 36 into bottom chamber 29 and through charcoal filters 58 into blower 46. Air (arrow D) which is admitted through grid 72 has not passed animal cages and accordingly is cleansed air and has passed directly into chamber 29.

Through operation, air pressure within work area 86 is slightly greater than atmospheric air. Accordingly, some air may escape from beneath curtain 80 into ambient air. Due to the laminer air paths, this air is air which has been cleaned by HEPA filter 44 and is free of fur, dander and microorganisms. To make up this lost air, grid 56 permits makeup air to be admitted from ambient air into the blower 46.

The positioning of grid 72 towards the bottom of work area 86 provides for a relatively low resistance air path for air to flow from screen 88 back to blower 46. Accordingly, use of grid 76 insures that air will be drawn downwardly throughout chamber 86 so that clean air may be distributed evenly throughout the vertical dimension of the rack portion 16.

From the description of the apparatus and its operation, it can be seen that the air within work area 86 always consists of air which has been cleaned of microorganisms by HEPA filter 44. Further, this air is passed through the animal cages without the animal cages being contaminated with dirty air from other animals within the rack. The grid 72 insures uniform distribution of clean air to each shelf within the rack portion and also insures that clean air is drawn to the bottom of the work area 86 so that any air that might escape from beneath curtain 80 is clean air which will not contaminate the work environment.

From the foregoing detailed description of the present invention, it has been shown how the objects of the invention have been attained in a preferred manner. However, modifications and equivalents of the disclosed concepts such as readily occur to those skilled in the art are intended to be included in the scope of this invention. Thus, the scope of this invention is intended to be limited only by the scope of the claims as are or may hereafter be appended hereto.

I claim:

1. A work station comprising:
   a housing having an interior, said housing having first and second openings therethrough in air flow communication with said interior;
   a first filter medium disposed to filter particulate matter from air flowing through said first opening;
   a second filter medium disposed to filter particulate matter from air flowing through said second opening, said second filter medium selected to filter particulate matter finer than particulate matter filtered by said first filter medium;
   blower means for drawing air through a blower inlet and blowing air through a blower outlet;
   motor means for driving said blower means;
   air flow guide means for defining air flow pathways including a first pathway from said first filter media to said blower inlet and a second pathway from said blower outlet to said second filter medium;
   enclosing means cooperating with said housing to define an enclosed work area on a side of said housing in air flow communication with said first opening;
   air directing means for defining an air flow pathway from said second opening to said work area, said air directing means including an air inlet disposed at an upper portion of said work area and duct means for directing air from said second opening to said air inlet, with said air flowing downwardly in said work area and past said first opening, air passage means disposed near a bottom of said work area and in air flow communication with said blower inlet to draw said air downwardly
   whereby a portion of air flow into said work area is drawn downward an entire height of said area and a portion of said downward flowing air is drawn through said first opening so that items to be segregated can be placed in said area between said downward flowing air and said first opening with air flow protecting an operator in said work area from contamination from said items and segregating said work area from a surrounding environment.

2. A work station according to claim 1 comprising an air inlet formed in said housing in air flow communication with said blower inlet and disposed to draw air from ambient air exterior of said work area.

3. A work station according to claim 1 comprising charcoal filter means disposed to filter air flowing into said blower inlet.

4. A work station according to claim 1 wherein said air flow guide means includes a pressure plenum having a first end surrounding said second filter media with said pressure plenum defining said second pathway as an enclosed volume having a pressure greater than ambient air exterior of said housing;
   said first filter medium, said pressure plenum and said housing presenting opposing surfaces cooperating to define said first pathway, a volume in direct air flow communication with said blower inlet and having a pressure less than ambient air pressure.

5. A work station according to claim 1 wherein a plurality of shelving is provided within said work area and secured adjacent to said first opening.

6. A work station according to claim 1 wherein said first filter medium is a prefilter and said second filter medium is a HEPA filter.

7. A work station comprising:
a housing having an interior, said housing having first and second openings therethrough and air flow communication with said interior;
a first filter medium disposed to filter particulate matter from air flowing through said first opening, said first filter medium selected to remove animal fur from air flow;
a second filter medium disposed to filter particulate matter from air flowing through said second opening, said second filter medium selected to filter particulate matter finer than particulate matter filtered by said first filter medium;
blower means for drawing air into a blower inlet and blowing air out a blower outlet;
a pressure plenum having a first end surrounding said blower outlet and a second end surrounding said second filter with said pressure plenum defining an enclosed volume having an air pressure greater than ambient air exterior of said housing;
said pressure plenum, said first filter and said housing presenting opposing surfaces cooperating to define an enclosed vacuum volume in direct air flow communication with said blower inlet and having a pressure less than ambient air pressure;
enclosing means for cooperating with said housing to define an enclosed work area on a side of said housing in air flow communication with said first opening;
a plurality of animal cages disposed within said work area and adjacent to said first opening exterior of said housing;
air directing means for directing air flow from said second opening to said work area and including an air inlet at an upper portion of said work area in air flow communication with said second filter medium
an air passage at a lower portion of said work area in air flow communication with said blower inlet cooperating with said air inlet at said work area upper portion to draw air downwardly within said work area with said plurality of cages disposed between said downwardly flowing air and said first opening whereby clean air flows downwardly into said work area with a portion of said clean air drawn past said cages and through said first inlet to thereby protect an operator in said work area from contamination and air pressure within said work area abating flow of untreated air from exterior of said station into said work area and contaminating air within said work area.

8. A work station according to claim 7 wherein said housing includes an air inlet at a lower portion of said housing in direct air flow communication with said blower inlet.

9. A work station according to claim 7 wherein said housing has an air inlet in air flow communication with said blower inlet and disposed to draw air from ambient air exterior of said housing and exterior of said work area.

10. A work station according to claim 7 comprising charcoal filter means disposed to filter air drawn into said blower inlet.

11. A work station comprising:
a plurality of animal cages;
a work area disposed on a predetermined side of said cages;
means for enclosing said work area;
purifying means for purifying air of contaminants;
means for admitting purified air from said purifying means to an upper portion of said work area at a pressure greater than ambient air pressure;
means for applying a suction at a lower portion of said work area to draw said purified air downwardly from said upper portion to said lower portion with said air flowing past a predetermined frontal area of said cages;
air urging means for urging air from said work area to flow through said cages; and
said air urging means including means for drawing a suction on a back area of said cages to draw a portion of said air flowing downwardly in said work area through said cages.

12. A work area according to claim 11 comprising filter means disposed to filter air drawn through said cages under suction and low air flow resistance means for drawing air from a bottom portion of said work area with an air flow resistance less than an air flow resistance provided by said filter means.

13. A work area according to claim 11 wherein said filter means is a prefilter selected to filter animal hair from air flow;
means for urging prefiltered air under pressure through a HEPA filter to purify said air.

* * * * *